Patented Mar. 27, 1951

2,546,568

UNITED STATES PATENT OFFICE 2,546,568

PROCESS FOR THE PRESERVATION OF COMESTIBLE MATERIALS

Lorenzo D. Taylor, Lewiston, N. Y., assignor to Mathieson Chemical Corporation, a corporation of Virginia No Drawing. Application January 11, 1945, Serial No. 572,421

9 Claims. (Cl. 99—150)

This invention relates to the preservation of comestible materials and particularly their preservation by the treatment thereof with chlorine dioxide. The invention is applicable to the preservation of a wide variety of readily perishable foodstuffs of a non-cereal type normally containing high percentages of moisture and subject to deterioration by reason of micro-organisms, including meats, fish, fresh fruits and vegetables in either raw, cooked, or partially cooked condition.

It has previously been proposed to bleach, age, sterilize and change the baking qualities of flour, meal, and similar cereal products relatively low in moisture content by treatment with chlorine dioxide. It has also been proposed to spray plants with a solution of chlorine dioxide for the elimination of animal or vegetable pests such as caterpillars, lice, blights, and the like. However, to my knowledge, it has not heretofore been known that foodstuffs of the non-cereal type, and which normally contain high proportions of water, could, with advantage, be preserved by treatment with chlorine dioxide.

In the prior art of preserving foodstuffs of the non-cereal type for later consumption, which has developed since the time of Appert, early in the 19th century, a variety of processes including the use of both chemical and physical agents have been proposed and used. The presently most widely used of these suggested methods depend on the use of heat for destroying the organisms responsible for deterioration of the foodstuffs. Desiccation is also used to a considerable extent as well as the practice of salting certain foods, particularly meat. The application of chemical agents has not been widely adopted since it is frequently more expensive than the application of heat, and since such agents are frequently not effective in killing undesirable micro-organisms, particularly in the presence of large amounts of other organic matter, and finally because when sufficient quantities of the usual chemical agents are used to accomplish this purpose undesirable residues are frequently formed in the foodstuffs and undesirable tastes and odors developed.

In spite of the wide application of the use of heat in the preservation of food, this process has several disadvantages. In the first place, to obtain a suitable degree of heat for the purpose of destroying micro-organisms it is necessary to cook the food substantially. Such cooking frequently has the undesirable result of decomposing vitamins and other heat-labile materials which are found in uncooked foods and which it is desirable to retain. The cooking process furthermore usually changes the taste and odor of the foodstuffs so that their condition when cooked is less desirable than that of the fresh food. Another disadvantage of the cooking process is that it is frequently difficult to destroy spore-forming organisms short of substantial degradation of the foodstuffs. As a result, particularly in canned foods, the contents of a certain percentage of units decomposes and such loss is regarded by the industry as unavoidable.

It is an object of this invention to provide a method for the treatment of such comestible materials of the non-cereal type which will avoid the difficulties and disadvantages of the prior art.

It is a further object of this invention to provide an improved method for the preservation of such comestible materials without deleteriously affecting the taste, odor and nutritional values.

It is another object of the present invention to provide a method for the preservation of such foodstuffs in their raw or uncooked state, with attendant advantages in their taste, odor and nutritional properties.

Other and further objects of the present invention will appear in the following more specific disclosure of the invention.

Broadly, the present invention contemplates the use of chlorine dioxide, either as a gas or in a suitable solvent, for instance water, for the treatment of the comestible materials prior to or simultaneously with their treatment for storage, for instance canning. Raw or cooked foodstuffs may be treated with chlorine dioxide although it is usually more advantageous to treat uncooked foodstuffs which may then be sealed in containers where they will keep indefinitely in a fresh condition.

For the purposes of the present invention, chlorine dioxide may be generated by any convenient method and obtained in dilute admixture with air or other inert gas, or it may be collected advantageously in a water solution with which the foodstuff is subsequently treated. For example, the foodstuffs may be washed, reduced to suitable size pieces and placed in a container, such as a glass jar, which is then filled with air containing a suitable proportion of chlorine dioxide. The cover may be secured and the food preserved indefinitely. Alternatively, the foodstuff may be covered with a dilute aqueous solution of chlorine dioxide in a glass jar or other suitable container and tightly closed. It is sometimes necessary and frequently advantageous to combine a mild heat treatment with the chlorine dioxide treatment, although in general substantial cooking need not occur. Thus a variety of foodstuffs covered with a dilute aqueous chlorine dioxide solution have been heated at temperatures and pressures each approximately one-third that recommended for commercial canning. On storage, these samples have been perfectly preserved, frequently with improved color at the end of the storage period compared to samples not treated with chlorine dioxide and canned according to conventional practice.

The present process has been found particularly suitable for the preservation of a wide variety of fruits and vegetables, for instance, peas, beans, carrots, pumpkin, pears, tomatoes and the like. It is also suitable for other such fruits and vegetables commonly preserved in cans or glass containers. It will also be found suitable for the preservation of such perishable materials as mushrooms, which will not require blanching, meats and fish, including clams, oysters, shrimp and the like. The application of the present process to the preservation of frozen fruits and vegetables will be found particularly advantageous where the foodstuff is treated with chlorine dioxide before freezing.

Usually small proportions of chlorine dioxide are ample to accomplish the purposes of the present invention, for example, 50 P. P. M. of chlorine dioxide in water solution frequently serves although larger proportions may be used even up to the limit of solubility of the gas in water. It is advantageous to use buffering agents in more concentrated solution to prevent the development of acidity to any undesirable degree. In gaseous admixture with air, for example, any proportion of chlorine dioxide may be used up to the limit of about 100,000 P. P. M., above which chlorine dioxide may under some conditions be unstable. Ordinarily, much lower concentration in air, of the order of 2,000 to 4,000 P. P. M., are satisfactory, although in particular cases as much as 20,000 or 30,000 P. P. M. of chlorine dioxide in air may be used.

Compared with other chemical agents which have been suggested for the present purposes, chlorine dioxide has numerous advantages. Its action results in the formation of no undesirable residual products and it commonly improves taste and odor as well as color stability of uncooked foodstuffs. In comparative tests using aqueous solutions where approximately 20 P. P. M. of chlorine dioxide in water was effective, sulphur dioxide in a concentration of 450 P. P. M. did not destroy the micro-organisms and sodium benzoate was ineffective in concentrations as high as 2000 P. P. M. Furthermore, in the presence of organic matter such as meats, fish, fruits and vegetables, chlorine dioxide seems to have little or no effect on the vitamin content of the food. Particularly, tests have indicated that it has no effect on the ascorbic acid content. Reagents such as hypochlorites, particularly calcium hypochlorite, hydrogen peroxide and even sodium chlorite are less desirable and commonly develop a distinctly undesirable odor of oxidation products or of chemical residues.

The effectiveness of chlorine dioxide in destroying micro-organisms increases with acidity and in alkaline solution may react with other organic matter present as well as with the micro-organisms. At lower pH values its selectivity for the latter is greatly increased and in general it has substantially no action on the foodstuff. It is advantageous to operate in the vicinity of substantial neutrality and particularly over the range of pH 5–7 although in some cases it may be desirable to use somewhat higher or even lower pH's, say 4 to 10.

The following examples of the present invention are supplied for purposes of illustration only and I wish not to be limited thereto but only by the appended claims interpreted as broadly as the prior art permits. In the first 12 examples relating to the preservation of foodstuffs contaminated with thermophilic bacteria, inoculation of the samples was accomplished with a mixture of the organisms known as *Cl. thermosaccharolyteum* and *Cl. negrificans*.

Example I

Fifty grams of green string beans were cut into 1″ lengths and covered with 200 ml. of tap water. Another 50 g. of the beans similarly cut were covered with 200 ml. of water containing 50 P. P. M. of available chlorine as $ClO_2$ dissolved therein. After standing at room temperature for 30 minutes, all available chlorine had been consumed. Both samples were boiled for 60 minutes and allowed to cool. Agar plates were prepared in the usual manner from each of these samples, and thermophiles were found in the untreated sample but were absent in the $ClO_2$-treated sample. After the samples had stood four days the untreated sample was moldy but the $ClO_2$-treated sample was free from mold and had a pleasant odor.

Example II

Two samples of yellow snap beans of 50 g. each were inoculated with thermophiles. One was covered with 200 ml. of water and the other with the same amount of water containing 50 P. P. M. of available chlorine as $ClO_2$. After standing 30 minutes no more available chlorine was present. The samples were boiled for 1 hour and allowed to stand at room temperature for 2 days. The blank had by then developed a sour odor while the treated sample had a good odor. Thermophiles were absent in the treated sample but present in the blank.

Example III

Two 50 g. samples of fresh beets were inoculated with thermophiles and covered with 200 ml. of water in one case and with 200 ml. of water containing 50 P. P. M. of available chlorine as $ClO_2$ in the other. On standing exposed at room temperature for several days, the untreated sample was spoiling but the sample treated with $ClO_2$ remained unspoiled.

Example IV

A 50 g. sample of fresh carrots was inoculated with thermophiles and covered with 200 cc. water containing 50 P. P. M. of available chlorine as $ClO_2$. After standing for half an hour a sample was tested bacteriologically by plating out. No thermophile colonies were found.

Example V

Ten samples of 50 g. each of fresh green beans were covered with 200 ml. of water containing 1, 2, 4, 6, 8, 10, 20, 30, 40 and 50 P. P. M. respectively of available chlorine as $ClO_2$. A blank was prepared in the same way using 200 ml. of water without $ClO_2$. After 48 hours the sample treated with water containing no $ClO_2$ had completely spoiled and those treated with water containing $ClO_2$ in 1, 2 and 4 P. P. M. had developed a somewhat sour odor but the rest were in perfect condition.

Example VI

Fresh carrots, beans and beets were washed, cut in small pieces and placed in glass jars making two samples of each vegetable. One of each pair of samples was almost filled with water and the other with an aqueous $ClO_2$ solution containing 50 P. P. M. of available chlorine. After standing 30 minutes they were placed in an oven at 300° F. for 1 hour. This is only ⅓ of the time recommended for canning these vegetables. After removing from the oven, the tops were tightly closed and the bottles stored at room temperature in the light.

The carrots untreated with $ClO_2$ all spoiled in about 4–5 days while the treated ones were in good condition after 25 days.

The beans untreated with $ClO_2$ spoiled quickly. The beans treated with $ClO_2$ had not spoiled when opened 6 days later.

The beets remained unspoiled until opened, but the sample treated with $ClO_2$ had much better odor and color than the untreated sample.

Example VII

Two samples of 50 g. each of carrots were prepared and inoculated with thermophiles. One sample was covered with water and one with water containing 50 P. P. M. available chlorine as $ClO_2$. After standing 1 hour the $ClO_2$-treated sample had a considerably better odor and color. The samples were placed in the oven at 300° F. for 1 hour, removed and tightly closed. The sample covered with water, only, spoiled in two days but the $ClO_2$-treated sample was still good at the end of 21 days.

Example VIII

Green beans, green peppers and pears were inoculated and treated as in Example VII. The color of the pears and beans treated with the $ClO_2$ was much superior to the color of those not treated with $ClO_2$. After 5 days the beans and peppers untreated with $ClO_2$ had spoiled but the samples treated with $ClO_2$ were tasted and found to be in good condition. Also, at that time the pears treated with $ClO_2$ had a distinctly better taste than the pears not so treated.

Example IX

Thermophilic bacteria were added to samples of green beans cut into ½" lengths and placed in 4-oz. wide-mouth screw-cap bottles. They were covered with an aqueous $ClO_2$ solution containing 50 P. P. M. available chlorine and the caps were screwed on tightly. These samples were not heated but stood at room temperature. They were still in good condition after nine months.

Example X

Tomatoes treated according to the procedure of Examples VI were still good after 7 months but the sample untreated with $ClO_2$ spoiled after about 2 months. Also the samples treated with $ClO_2$ had much the better color.

Example XI

Two samples each of fresh corn and of beans in glass jars were inoculated with thermophiles. One sample of each vegetable was covered with an aqueous $ClO_2$ solution, equivalent to 50 P. P. M. of available chlorine and the other covered with tap water, after which all were heated in an oven at 330° F. for half an hour. Screw lids were tightened by hand and the jars allowed to stand. After 13 days the beans untreated with $ClO_2$ had spoiled and the corn untreated with $ClO_2$ had a heavy growth of mold on top. The $ClO_2$-treated sample of each vegetable was in good condition.

Example XII

A can of pumpkin pulp inoculated with thermophiles was treated by agitating with 50 P. P. M. available chlorine as $ClO_2$ in water and was heated under 15 lb. pressure for 30 minutes, one-half the ordinarily recommended time. An inoculated blank sample was similarly heated. The containers were closed and stored at room temperature. Several weeks after canning, the blank sample had lost its orange color but the $ClO_2$-treated sample retained its color and was in good condition nine months later.

Example XIII

Dilute (10%) pea juice was inoculated with the spore-forming flat sour organism, identified by National Canners' Association as No. 1518, and treated by blowing with 400 P. P. M. of available chlorine as chlorine dioxide in air for slightly less than 5 minutes. That the micro-organisms were completely removed by this treatment was indicated by the fact that incubation for 24 hours at 37° C. developed no colonies.

Example XIV

Diluted pea juice such as used in the foregoing example was inoculated with vegetative cells of a mixture of non-spore forming bacteria characteristic of those present in contaminated cannery cooling water, and treated by blowing with 100 P. P. M. of available chlorine as chlorine dioxide in air for 5 minutes. No bacteria colonies developed on 24 hour incubation at 37° C.

Example XV

A quantity of fresh peas, after shelling and washing, was covered with tap water containing 1 cc. of a thermophile suspension per 50 cc. of water. The thermophiles of the suspension were those identified by the National Canners' Association as No. PA-3679, and each cc. of the suspension contained 10,000 spores. After standing for 30 minutes in the thermophile infected water, the peas were drained and thereafter covered with a solution of chlorine dioxide containing 1,000 P. P. M. of available chlorine and 0.02% of a sulfated fatty alcohol wetting agent. The peas were permitted to stand in this solution for 15 minutes, at the end of which period the chlorine dioxide of the solution had become exhausted. The peas were again drained and a number of samples were prepared therefrom by weighing 50 grams of peas thus treated into two ounce wide-mouthed glass bottles having screw caps with plastic linings. To each sample there was added 1 percent of salt and 3 percent of sugar, by weight, and the respective samples were covered with an aqueous chlorine dioxide solution containing 700

P. P. M. of available chlorine. The pH of the respective solutions was adjusted to 6, 7, 8, 9 and 10 and the several samples were tightly sealed and stored in the light at room temperature for 28 days. All samples thus treated were found to be in good condition at the end of that period except that at pH 8 on which the seal was faulty.

Equally staisfactory results were obtained where the peas were inoculated subsequent to the preliminary chlorine dioxide treatment.

The effectiveness of chlorine dioxide in the preservation of meat and fish in accordance with my present invention is illustrated by two series of tests carried out under conditions designed to accelerate their deterioration. The results of these tests are set forth in the following tabulations.

In the first series of tests a sample of the indicated material was suspended in a wide mouth, stoppered bottle and there was passed through the bottle in contact with the sample chlorine dioxide diluted with air for the period of time and at the concentration indicated by the tabulation. Each sample was thereafter removed from the treating bottle and suspended in a tightly stoppered bottle for three days at a relatively warm room temperature, about 30° C., to accelerate spoiling. Corresponding samples of the same materials, which had not been subjected to the chlorine dioxide treatment, were similarly stored for a like period. Operating conditions were as follows:

Table I

| Example No. | Meat | | $ClO_2$ | | Time of Exposure, min. |
|---|---|---|---|---|---|
| | Kind | Wt., g. | G./min. | Total, g. | |
| XVI | Beef | 20 | 0.035 | 0.52 | 15 |
| XVII | do | 20 | 0.017 | 0.52 | 30 |
| XVIII | Fish | 20 | 0.008 | 0.48 | 60 |
| XIX | Lamb | 20 | 0.009 | 0.54 | 60 |
| XX | Pork | 20 | 0.009 | 0.54 | 60 |
| XXI | Veal | 20 | 0.009 | 0.54 | 60 |

Under the condition of the tests, all samples except the fish treated with chlorine dioxide showed some degree of deterioration, but, in each instance, the samples which prior to storage had been treated with chlorine dioxide showed much less deterioration. At the end of the accelerated test period the fish was found to be in good condition. The beef and lamb were somewhat sour, and the pork showed definite signs of deterioration. The veal was somewhat moldy but its odor was good. On the other hand, each of the blank samples had a rank odor indicating a much greater extent of deterioration.

Under conventional storage conditions, such as refrigeration or freezing, fish and meat similarly treated in accordance with my present invention may be preserved indefinitely in condition superior to that of the same materials not subjected to the chlorine dioxide treatment.

In a second series of tests portions of similar types of meat and fish were placed in containers and covered with aqueous solutions of chlorine dioxide of the concentration indicated in the following tabulation. Blanks were similarly prepared, except that the chlorine dioxide was omitted from the water in which the sample was submerged. As in the preceding tests, the samples were permitted to stand for three days at relatively warm room temperature to accelerate spoiling. The test conditions were as follows:

Table II

| Example No. | Meat | | $ClO_2$, P. P. M. |
|---|---|---|---|
| | Kind | Wt., g. | |
| XXII | Beef | 10 | 100 |
| XXIII | do | 10 | 50 |
| XXIV | Fish | 20 | 100 |
| XXV | Lamb | 10 | 100 |
| XXVI | Pork | 10 | 100 |
| XXVII | Veal | 10 | 100 |

At the end of this accelerated test period the condition of the sample treated with chlorine dioxide in accordance with my present invention was, in each instance, superior to that of the blank samples. The condition of the fish, lamb and pork was good. The beef had soured somewhat and the veal also showed signs of deterioration. On the other hand, the blank samples in each instance had a rank odor indicating extensive deterioration.

As in the preceding illustration, meats and fish submerged in aqueous solutions of chlorine dioxide may be preserved over greatly prolonged periods under conventional storage conditions.

I claim:

1. A process for the preservation of comestible materials of the non-cereal type and which normally contain high proportions of water whereby contaminating micro-organisms are eliminated without deleteriously affecting the taste, odor and nutritional value of the comestible material, which comprises treating the comestible material with chlorine dioxide.

2. A process for the preservation of comestible materials of the non-cereal type and which normally contain high proportions of water whereby contaminating micro-organisms are eliminated without deleteriously affecting the taste, odor and nutritional value of the comestible material, which comprises treating the comestible material with a gaseous mixture of chlorine dioxide and an inert gas.

3. A process for the preservation of comestible materials of the non-cereal type and which normally contain high proportions of water whereby contaminating micro-organisms are eliminated without deleteriously affecting the taste, odor and nutritional value of the comestible material, which comprises submerging the comestible material in an aqueous solution of chlorine dioxide.

4. A process for the preservation of comestible materials of the non-cereal type and which normally contain high proportions of water whereby the comestible material is protected from contaminating micro-organisms without deleteriously affecting the taste, odor and nutritional value of the comestible material, the process comprising treating the comestible material with chlorine dioxide, and sealing the comestible material in an impervious container in the presence of chlorine dioxide.

5. A process for the preservation of comestibles of the non-cereal type and which normally contain high proportions of water whereby the comestible material is protected from contaminating micro-organisms without deleteriously affecting the taste, odor and nutritional value of the comestible material which comprises treating the comestible material with chlorine dioxide, and sealing the treated material in an impervious container.

6. A process for the preservation of comestible materials of the non-cereal type normally containing high proportions of water whereby containing micro-organisms are eliminated without deleteriously affecting the taste, odor and nutritional value of the comestible material which comprises treating the comestible material with a gaseous mixture of chlorine dioxide and an inert gas in which mixture the chlorine dioxide concentration does not exceed about 4,000 parts per million.

7. A process for the preservation of comestibles of the non-cereal type and which normally contain high proportions of water whereby the comestible material is protected from contaminating micro-organisms without deleteriously affecting the taste, odor and nutritional value of the comestible material which comprises sealing the comestible material in an impervious container while immersed in an aqueous solution of chlorine dioxide.

8. A process for the preservation of comestibles of the non-cereal type and which normally contain high proportions of water whereby the comestible material is protected from contaminating micro-organisms without deleteriously affecting the taste, odor and nutritional value of the comestible material which comprises sealing the comestible material in an impervious container while immersed in an aqueous solution containing up to 1000 parts per million of available chlorine in the form of chlorine dioxide.

9. A process for the preservation of comestibles of the non-cereal type and which normally contain high proportions of water whereby the comestible material is protected from contaminating micro-organisms without deleteriously affecting the taste, odor and nutritional value of the comestible material which comprises immersing the comestible material in an aqueous solution containing up to 1000 parts per million of available chlorine in the form of chlorine dioxide, and sealing the material in an impervious container.

LORENZO D. TAYLOR.

REFERENCES CITED

The following references are of record in the file of this patent:

UNITED STATES PATENTS

| Number | Name | Date |
| --- | --- | --- |
| 1,098,006 | Allen | May 26, 1914 |
| 1,945,102 | Tranin et al. | Jan. 30, 1934 |

FOREIGN PATENTS

| Number | Country | Date |
| --- | --- | --- |
| 116,149 | Australia | Nov. 26, 1942 |